US007048852B2

(12) United States Patent
Ballard

(10) Patent No.: US 7,048,852 B2
(45) Date of Patent: May 23, 2006

(54) METHOD AND APPARATUS FOR TREATING WATER OR WASTEWATER TO REDUCE ORGANIC AND HARDNESS CONTAMINATION

(75) Inventor: Peter Temple Ballard, Glenn Allen, VA (US)

(73) Assignee: Infilco Degremont, Inc., Richmond, VA (US)

( * ) Notice: Subject to any disclaimer, the term of this patent is extended or adjusted under 35 U.S.C. 154(b) by 0 days.

(21) Appl. No.: 10/284,819

(22) Filed: Oct. 31, 2002

(65) Prior Publication Data

US 2004/0084379 A1 May 6, 2004

(51) Int. Cl.
*B01D 21/08* (2006.01)

(52) U.S. Cl. .................. 210/195.3; 210/197; 210/200; 210/201; 210/202; 210/205; 210/206; 210/207; 210/208; 210/521; 210/522; 210/528; 210/723; 210/726; 210/727

(58) Field of Classification Search ............. 210/195.3, 210/197, 200–202, 205–208, 521, 522, 528, 210/723, 726, 727
See application file for complete search history.

(56) References Cited

U.S. PATENT DOCUMENTS

| | | | | |
|---|---|---|---|---|
| 3,953,326 A | * | 4/1976 | Reimann | 210/604 |
| 4,203,837 A | * | 5/1980 | Hoge et al. | 210/705 |
| 4,415,467 A | * | 11/1983 | Piepho | 252/181 |
| 4,425,231 A | * | 1/1984 | Fujimoto et al. | 210/96.1 |
| 4,579,655 A | * | 4/1986 | Louboutin et al. | 210/195.3 |
| 4,950,396 A | * | 8/1990 | Skaar et al. | 210/195.3 |
| 5,238,579 A | * | 8/1993 | Shibley | 210/716 |
| 5,518,618 A | * | 5/1996 | Mulder et al. | 210/605 |
| 5,888,394 A | * | 3/1999 | Jan | 210/605 |
| 6,325,936 B1 | * | 12/2001 | Niijima | 210/626 |
| 6,383,370 B1 | * | 5/2002 | Keever et al. | 210/96.1 |

* cited by examiner

*Primary Examiner*—Minh-Chau T. Pham
(74) *Attorney, Agent, or Firm*—DLA Piper Rudnick Gray Cary US LLP

(57) ABSTRACT

A method of treating liquid including mixing coagulant with the liquid, introducing mixed coagulant and liquid into a primary reaction zone, containing an agitator, of a reactor which is substantially concentrically positioned with respect to a secondary reaction zone of the reactor, introducing flocculant into the primary reaction zone at a location between the agitator and where the mixed coagulant and liquid are introduced into the primary reaction zone, mixing the mixed coagulant and liquid with the flocculant and causing the resulting mixture to flow into the secondary reaction zone, introducing an encapsulating agent into the secondary reaction zone, recirculating the liquid and encapsulated flocs through the primary and secondary reaction zone, and passing the liquid and encapsulated flocs outwardly of the reactor, and an apparatus for treating liquids including a reactor, a draft tube substantially concentrically positioned within the reactor and being positioned such that the liquids may flow inwardly and outwardly of the draft tube from opposed end portions of the draft tube, wherein space inwardly of the draft tube forms a primary mixing zone and space in the reactor, but outwardly of the draft tube forms a secondary mixing zone, an agitator positioned within the draft tube, an inlet positioned approximate one end portion of the draft tube which introduces liquid and coagulant into the primary mixing zone, an inlet connected to the draft tube and positioned between the agitator and the end portion of the draft tube through which coagulant and liquid are introduced into the primary mixing zone, an encapsulating agent inlet positioned in the secondary reaction zone between the opposed end portions of the draft tube, and an outlet downstream of the encapsulating agent inlet.

14 Claims, 3 Drawing Sheets

METHOD AND APPARATUS FOR TREATING WATER OR WASTEWATER TO REDUCE ORGANIC AND HARDNESS CONTAMINATION

FIELD OF THE INVENTION

This invention relates to an apparatus and method for treating water or wastewater, particularly to an apparatus and method for treating water or wastewater that contains two or more contaminants which utilize substantially different conditions or environments for effective removal.

BACKGROUND

There are many instances in water and wastewater treatment when two very common contaminants, for example, (1) organics and (2) hardness, are removed to render the water usable for purposes of drinking, irrigation or other reuse applications, or for use in industrial processes.

The removal of organics (often collectively referred to as "Total Organic Carbon" or "TOC") is important in drinking water treatment because some organic constituents combine with chlorine used in water disinfection to form harmful and sometimes carcinogenic compounds. For this reason, TOC removal is important and strictly regulated in drinking water treatment. In other water and wastewater treatment applications, removal of organics is also important for varying reasons. Some common reasons are related to the ability of many organic compounds to foul downstream treatment processes (such as membrane processes) or industrial equipment (such as cooling tower packings, boilers and the like).

Removal of hardness (calcium and magnesium) is generally important because the presence of excessive levels of hardness can cause aesthetic problems for drinking water and also increases the potential for scaling and post-precipitation, which can be very harmful to pipes, downstream processes and industrial equipment.

These two common contaminants (organics and hardness) are simultaneously found at excessive levels in many water sources. Many drinking water sources (surface waters) contain high levels of both organics and hardness depending on the geographic location of the surface water (for example, such waters are commonly found in Florida in the United States). Increasingly, municipal and industrial wastewater effluents are being reused or recycled for purpose of irrigation or industrial process use. These waters often contain elevated levels of organics and hardness which may need reduction prior to the reuse application.

The removal of these two contaminants, when present simultaneously, has long been a challenge in the treatment of water and wastewater. The reason that the simultaneous removal of these two contaminants is very challenging is complex from a chemistry perspective. The physical-chemical removal of these two contaminants (organics and hardness) from water or wastewater can be very difficult because of the antagonistic conditions under which each removal process is accomplished or optimized. The most common approach for the removal of organics and hardness in waters which contain the two contaminants simultaneously has been either (1) two-stage clarification: a physical-chemical precipitation/adsorption process or (2) nanofiltration: a membrane process which incorporates a very small porosity fiber to separate a significant amount of hardness and organics via a physical barrier dependent upon molecular size exclusion.

With regard to the first alternative for simultaneous reduction of organics and hardness, physical-chemical precipitation, it would be clearly advantageous if there were some means to accomplish the chemically antagonistic goals of organics removal and softening within the same vehicle or process, without the necessity of a two-state process. This invention solves that problem by substantially improving the process and cost efficiency in accomplishing the desired reduction of both contaminants.

SUMMARY OF THE INVENTION

This invention relates to a method of treating liquid including mixing coagulant with the liquid, introducing mixed coagulant and liquid into a primary reaction zone, containing an agitator, of a reactor which is substantially concentrically positioned with respect to a secondary reaction zone of the reactor, introducing flocculant into the primary reaction zone at a location between the agitator and where the mixed coagulant and liquid are introduced into the primary reaction zone, mixing the mixed coagulant and liquid with the flocculent and causing the resulting mixture to flow into the secondary reaction zone, introducing an encapsulating agent into the secondary reaction zone, recirculating the liquid and encapsulated flocs through the primary and secondary reaction zone, and passing the liquid and encapsulated flocs outwardly of the reactor.

This invention also relates to an apparatus for treating liquids including a reactor, a draft tube substantially concentrically positioned within the reactor and being positioned such that the liquids may flow inwardly and outwardly of the draft tube from opposed end portions of the draft tube, wherein space inwardly of the draft tube forms a primary mixing zone and space in the reactor, but outwardly of the draft tube forms a secondary mixing zone, an agitator positioned within the draft tube, an inlet positioned approximate one end portion of the draft tube which introduces liquid and coagulant into the primary mixing zone, an inlet connected to the draft tube and positioned between the agitator and the end portion of the draft tube through which coagulant and liquid are introduced into the primary mixing zone, an encapsulating agent inlet positioned in the secondary reaction zone between the opposed end portions of the draft tube, and an outlet downstream of the encapsulating agent inlet.

DETAILED DESCRIPTION

Figure 1:
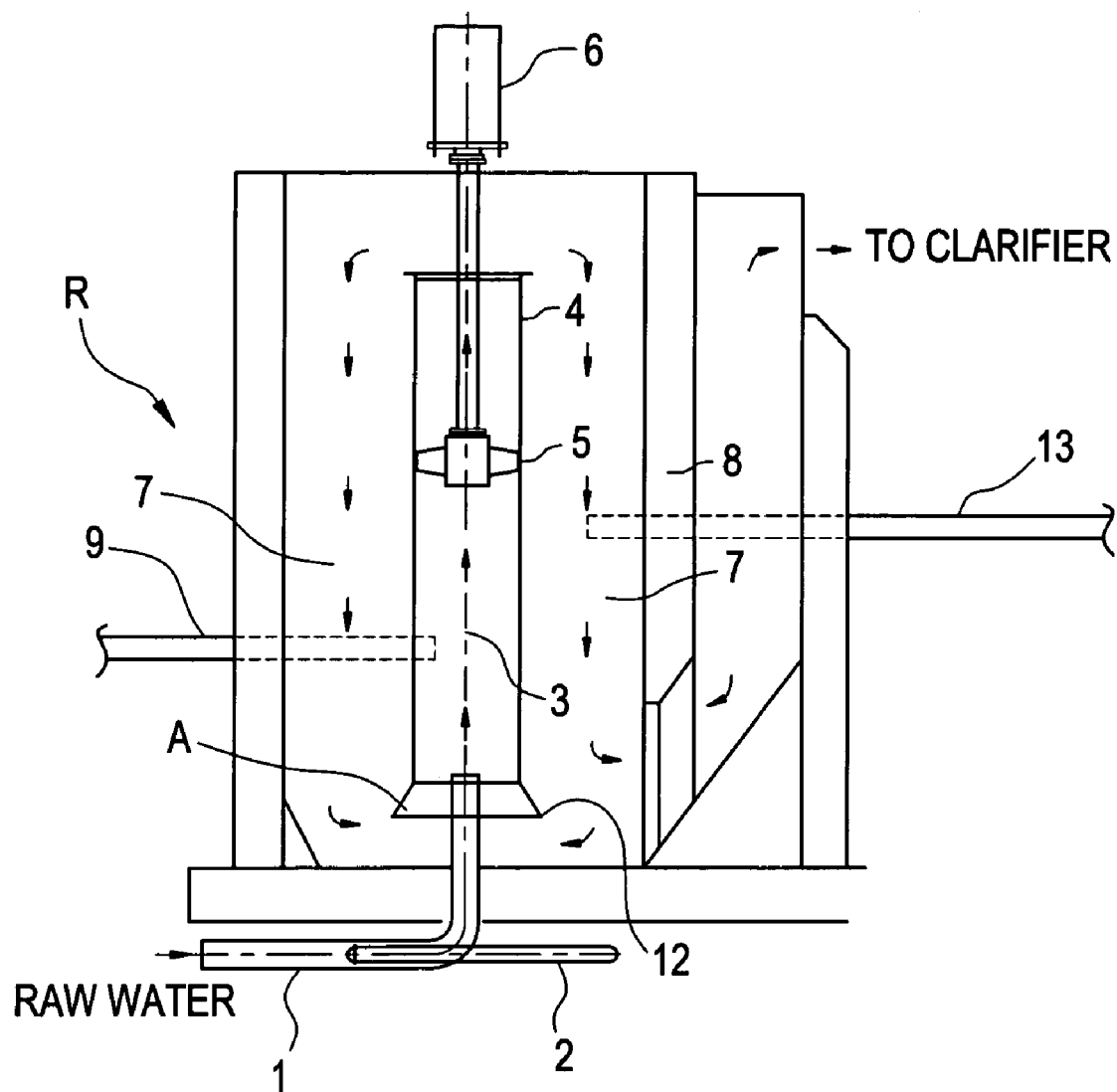
FIG. 1 is a schematic cross-sectional view of a reactor in accordance with aspects of the apparatus of the invention.

As noted above, the large majority of organics are removed most effectively under a completely different set of chemical circumstances than those where hardness is effectively removed.

Classically, removal of organics from waters has been accomplished primarily via a physical-chemical process known as coagulation. In that process, a metal salt or coagulant (such as ferric chloride or aluminum sulfate) is typically added to the water to be treated. The metal ion becomes ionized in solution and neutralizes physical surface charges on colloidal particles within the water to be treated. The neutralized particles no longer repel each other and can come together. As they come together, organics are absorbed and encapsulated within the metal hydroxide floc which forms (the metal chemically reacts with alkalinity in the source water to form a metal hydroxide, which is insoluble).

These coagulation reactions normally occur most effectively at nearly neutral pH. Although iron coagulants work effectively from pH 5 and higher, aluminum coagulants are used most effectively at pH 5.5–7.5 because of the amphoteric (soluble at both low and high pH's) nature of aluminum hydroxide. Where organic removal efficiency is required, it is important to control the pH of coagulation reactions at the lowest possible range. For alum, the best range is typically 5.0–6.0 and for ferric salts, even lower at 4.5–5.5. This is because most organics found naturally in waters and wastewaters (organic acids such as humic and fulvic acids) are removed much more efficiently at lower pH's. This is related to the impact of pH on the molecular charge on these compounds as well as the physical charge.

Chemically, this can be explained as follows for the case of humic acid (a common naturally occurring organic compound). At lower pH's (5–6), the basic removal mechanism for colloidal humic acid is charge neutralization by positively charged hydrolysis products. For soluble humics, the mechanism is actual chemical precipitation of iron or aluminum humate. At higher pH's, colloidal humic acids are removed less efficiently due to the hydrolysis products being less positively charged. Adsorption and encapsulation help at the higher pH's as well as the low pH range. For soluble humic acid in the case of higher pH's, the removal of humate compounds is less efficient because of the competing effects of hydroxide precipitation and coprecipitation. Due to such effects, removal efficiencies for such organics can be as high as 80% or more at lower pH's, while at very high pH's removal efficiencies might be as low as 10–20%.

Classically, hardness is removed from waters or wastewaters by a physical-chemical precipitation process known as softening. Softening implies addition of an alkaline chemical such as sodium hydroxide or calcium hydroxide (lime) to increase the pH and, subsequently, precipitate calcium carbonate and magnesium hydroxide. A high pH is important to this precipitation process because calcium carbonate precipitates at such pH's where bicarbonate alkalinity is converted to carbonate alkalinity (typically above pH 8.3) and magnesium hydroxide precipitates at such pH where free hydroxide is available (typically at pH's>10). Complete precipitation of magnesium hydroxide typically occurs at pH of at least 11.2.

This invention accomplishes multiple water or wastewater treatment objectives within a singular water treatment mechanism or vessel via the unique attributes of that vessel and implementation of chemical injection at strategic locations within that vessel. One advantage of the invention lies in the ability to accomplish multiple water treatment objectives which heretofore required separate stages or vessels and/or to accomplish these objectives to a substantially greater efficiency (thus eliminating use of two stages or vessels to accomplish such treatment objectives).

An example of such a two or multi-stage process is the removal of calcium hardness simultaneously with reduction of Total Organic Carbon (TOC) in potable water treatment or process water treatment. Such a two-fold objective is commonly encountered in drinking water and industrial process arenas. The two objectives are antagonistic to each other, as TOC removal is commonly accomplished at a lower pH (typically 4–8) due to the substantially greater removal efficiency of the organic compounds at that pH (because of solubility and molecular/particle charge) and hardness removal is typically accomplished at higher pH values (9.5–11.5) due to the need to create carbonate and free hydroxide alkalinity to precipitate such compounds. Also, the presence of substantial levels of TOC (organic compounds) often inhibits the chemical reaction in which the calcium is precipitated. This invention provides for efficient removal (and substantially greater removal as compared to any clarifications commonly applied) of TOC and hardness in a singular vessel.

Accordingly, this invention relates to both the method to accomplish such efficient simultaneous removal of these contaminants and the apparatus which provides such substrate as is required to effect the method.

This invention most preferably utilizes selected portions of apparatus described in U.S. Pat. No. 4,579,655, the subject matter of which is incorporated by reference. That apparatus includes a reaction tank for receiving water to be treated and forming sludge of flocculated or crystalline precipitated matter contained in the water, a concentrating tank for receiving the water and sludge from the reaction tank, for removing sludge and matter from the water, and for thickening and concentrating the sludge, a lamella settling tank for receiving water from the concentrating tank and removing therefrom by settling remaining sludge and matter, means for removing treated water from the lamella settling tank, means for recycling to the reaction tank a portion of the sludge from the concentrating tank prior to the maximum concentration therein of the sludge, and means for removing concentrated sludge from the concentrating tank. The sludge recycled from the concentrating tank may be in conjunction with or not sludge withdrawn from the lamella settling tank.

Turning now to FIG. 1, water or wastewater to be treated enters reactor R through a conduit or pipe 1. A first chemical may be added to the liquid. The first chemical is a coagulant, preferably ferric or aluminum salt, organic coagulant or the like and is added to the liquid to be treated upstream of point A where the water/wastewater is introduced into the reactor R. Point A is preferably located close to lower end portion 12 of inner draft tube 4. Coagulation begins as the liquid flows toward point A and the lower interior portion 3 of inner draft tube 4. The space inside the draft tube is the primary mixing zone. Coagulated water is most preferably combined with recycled pre-formed precipitant (e.g., sludge) which is externally recycled from a clarifier thickener portion of the overall treatment system by way of pipe 2 which in FIG. 1 connects to pipe 1 at junction B. Sludge may be introduced to the liquid either before, simultaneously or after coagulant is added to the liquid.

A flocculant chemical/polymer (hereinafter sometimes referred to as "flocculant") is introduced into draft tube 4 at a location between point B and impeller 5. Impeller 5 is most preferably located in an upper portion of draft tube 4. Pipe or conduit 9 represents a preferred location for such introduction. Solids in the liquid aid in catalyzing reaction kinetics by providing greater crystalline surface area. The combined raw liquid, coagulated floc, and recycled solids flow upwardly through lower interior portion 3 and through impeller 5 which provides the mixing and upward velocity of the liquid flow. Impeller speed can be controlled to optimize the velocity and mixing through draft tube 4 via a variable speed drive 6. Preferably, this is achieved by connection to a control system (not shown) for the overall treatment system. The flow of liquid and coagulated floc flows over the top baffle 11 of inner draft tube 4. Flow is directed toward and downwardly through an outer or secondary mixing zone 7. Organics which have been precipitated or adsorbed in primary mixing zone 3 are reformed and re-flocculated due to the less energetic flocculation mixing which occurs as the liquid passes through secondary zone 7.

A second chemical such as lime, sodium hydroxide or the like (hereinafter sometimes referred to as "encapsulating agent") is added in secondary mixing zone 7 between baffle 11 and draft tube lower edge portion 12. The second chemical is preferably added at a location between the middle 50% of the distance between baffle 11 and edge portion 12, most preferably at about the midpoint as shown by pipe 13.

This chemical reaction is relatively rapid. Thus, calcium carbonate and/or magnesium hydroxide begin to form and the relatively dense calcium carbonate and/or magnesium hydroxide forms a tough outer surface which encapsulates the organics previously precipitated and adsorbed. When these combined flocs flow back under edge portion 12 of inner draft tube 4 and back into inner draft tube 4 to be again combined with recirculated solids from the clarifier/thickener, the organics are not released, but maintained fully in the floc. This sharply contrasts with classical processes in which the coagulant and softening chemicals are added at the same time (in which the organics are not effectively removed because of the high pH) or if they were added separately, there is no segregation and proper flow and mixing energy to accomplish segregated reactions and effective encapsulation of the organics.

Accordingly, this invention provides a unique and substantially advantageous ability to accomplish multiple treatment objectives (as an example, reduction of organics and hardness) simultaneously. Bench-scale and field testing results confirm that, when selected chemicals are applied at selected locations within reactor R, chemical reactions are carried out in a unique fashion as compared to conventional clarification apparatus. Without being bound by any particular theory, this unique effect is explained, in the case of simultaneous organic and hardness removal for example, as follows:

The coagulant chemical is added upstream of the point of introducing the water/wastewater into reactor R as desired. This initiates a coagulation chemical reaction in which organics (or other coagulation objectives) can be accomplished. This reaction is allowed to carry on through the inner draft tube 4 or primary mixing zone 3 of reactor R. Coagulation is effectively accomplished, allowing removal of colloidal particles and organics, via coagulation and adsorption processes. The flocculating chemical is added so that this precipitated solid is flocculated and agglomerated. The floc particle exits primary mixing zone 3 and enters outer or secondary mixing zone 7. The secondary reaction chemical or encapsulating agent (such as sodium hydroxide or lime, for example) is added in secondary mixing zone 7. At this point, the floc becomes well-formed and flocculated. The second chemical reacts with the liquid to begin the chemical reaction to form calcium carbonate and magnesium hydroxide. The products of this reaction form on the outside of the preformed metal hydroxide floc, providing an encapsulating or protective effect. This protects the metal hydroxide floc (with the adsorbed or encapsulated organics intact) from desorption or loss of the organics back into solution. Once these combined solids are recirculated within draft tube 4 or reactor R, the calcium carbonate floc is substantially strong to protect the metal hydroxide floc from degradation and ultimately from desorption of colloidal or organic contaminants.

This unique process is achieved by a combination of carefully controlled chemical injection locations in combination with the unique mixing energies and isolation provided by the apparatus as described. The combined removal of organics and hardness is but an example of how this process can provide substantial benefit in water and wastewater treatment—many more instances exist.

Figure 2:
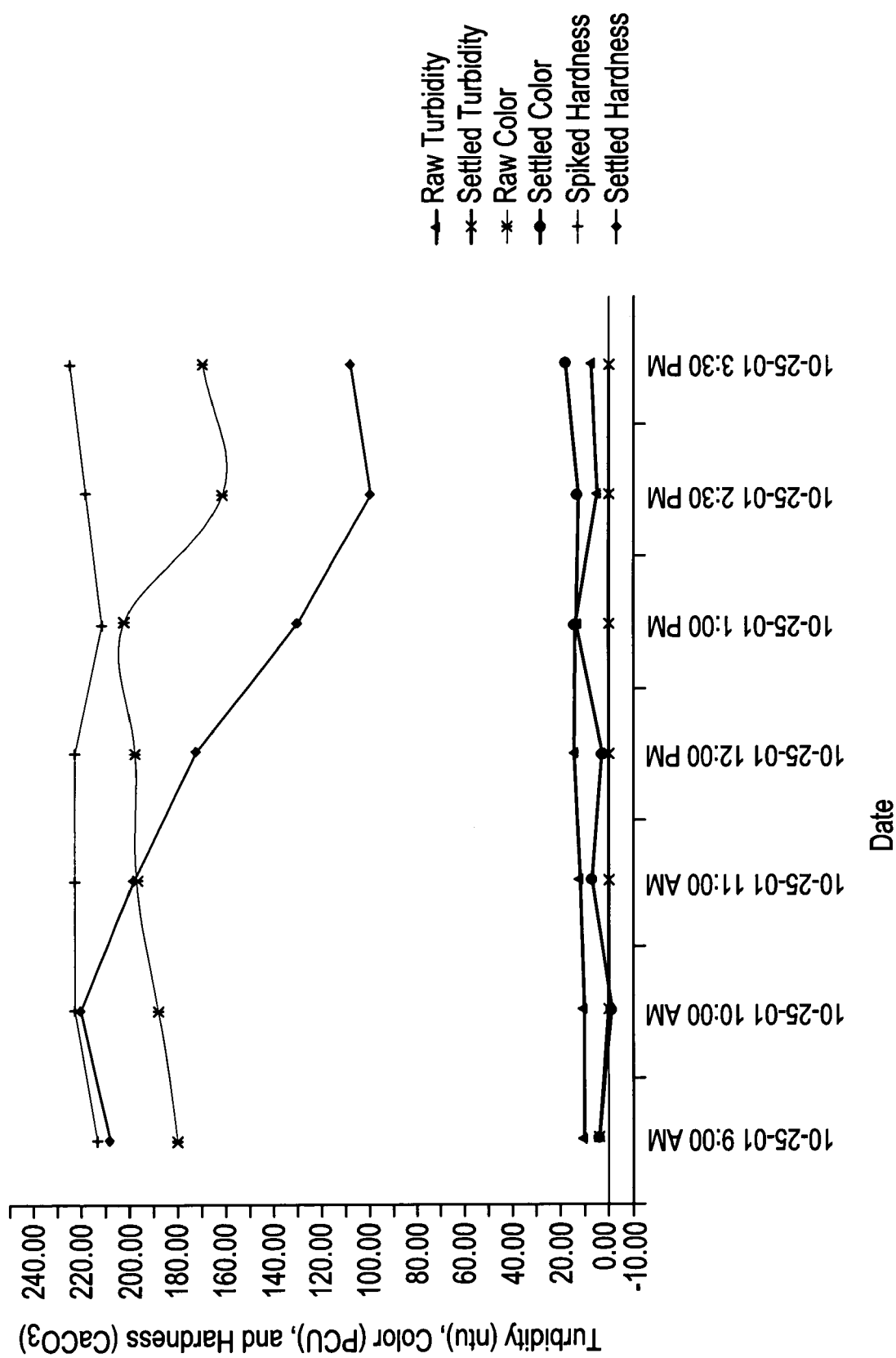
FIG. 2 is a graph of test data showing simultaneous reduction of organics and hardness with lime/ferric sulfate in terms of turbidity, color and hardness over time.
Figure 3:
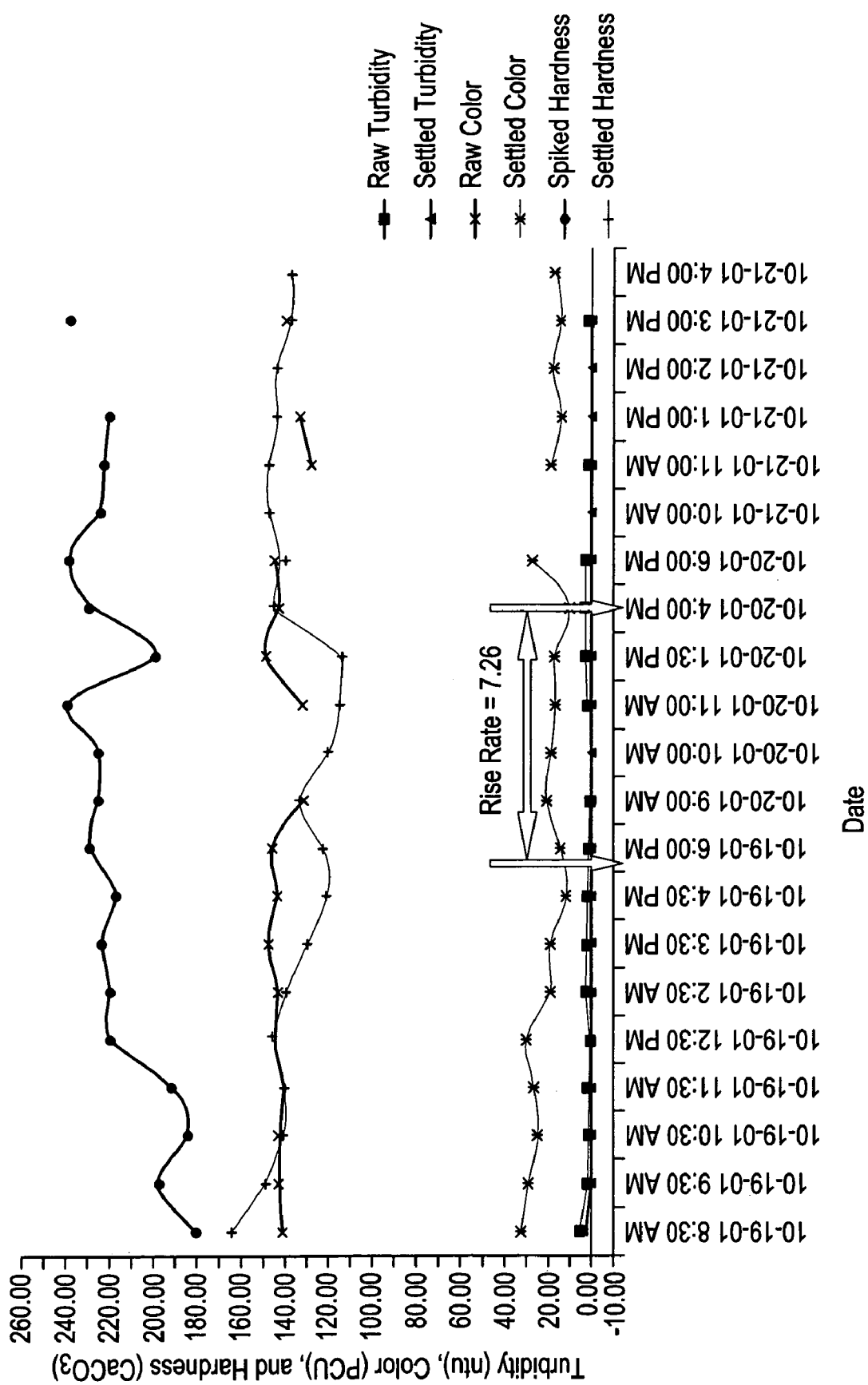
FIG. 3 is a graph of test data showing simultaneous reduction of organics and hardness with NaOH/ferric sulfate in terms of turbidity, color and hardness over time.

FIGS. 2 and 3 illustrate data obtained from a pilot study of the apparatus and method of this invention. FIG. 2 represents data obtained for color removal (proportional to organics removal) and hardness removal simultaneously using ferric sulfate and lime. Color (organics) was reduced from 150–210 PCU (Platinum-Cobalt Units) to <20 PCU (>90% reduction) and hardness was reduced from approximately 220 mg/l as $CaCO_3$ down to <100 mg/l as $CaCO_3$ (as required for the specific utility where the pilot study was performed). Separate lab testing confirmed that such simultaneous reduction of color or organics and hardness was unobtainable with a single-stage conventional process. In fact, the lab testing indicated that softening was inhibited by the organics. A reduction in hardness could not be obtained and reduction or organics at the high pH necessary for the softening reaction produced only <20% reduction or organics. The ability to achieve successful results in the pilot test is related directly to the specific application locations of the chemicals and the apparatus of this invention.

Further successful pilot test results of this invention for a different chemical regime (sodium hydroxide and ferric sulfate) are shown in FIG. 3.

In summary, the method and apparatus of this invention provides substantially improved capability to reduce organics and hardness simultaneously via physical-chemical precipitation in a single reactor/clarification device. The improvement in removal efficiency of the contaminants varies according to the specific qualities of the water or wastewater to be treated, but improvements have been in the range shown in Table 1 below.

TABLE 1

Comparison of method/apparatus of invention and classical treatment techniques.

| Parameter/Treatment | Organics (TOC) Reduction | Hardness Reduction |
|---|---|---|
| Classical Single-Stage | 0–25% Reduction | Possibly Inhibited |
| Invention | 50–85% Reduction | Not Inhibited |

What is claimed is:

1. A method of treating liquid comprising:
   mixing coagulant with the liquid;
   introducing mixed coagulant and liquid into a primary reaction zone, containing an agitator, of a reactor which is substantially concentrically positioned with respect to a secondary reaction zone of the reactor;
   introducing flocculant into the primary reaction zone at a location between the agitator and where the mixed coagulant and liquid are introduced into the primary reaction zone;
   mixing the mixed coagulant and liquid with the flocculant and causing the resulting mixture to flow into the secondary reaction zone;
   introducing an encapsulating agent into the secondary reaction zone;

recirculating the liquid and encapsulated flocs through the primary and secondary reaction zone; and passing the liquid and encapsulated flocs outwardly of the reactor.

2. The method of claim 1, further comprising introducing sludge into the liquid prior to introduction of the mixed coagulant and liquid into the primary reaction zone.

3. The method according to claim 1, wherein the encapsulating agent is introduced into the secondary reaction zone at approximately a midpoint of the length of the secondary reaction zone.

4. The method according to claim 1, wherein flow of the liquid through the primary reaction zone is in an upward direction.

5. The method according to claim 1, wherein the flow of liquid in the secondary reaction zone is in the downward direction.

6. Apparatus for treating liquids comprising:

a reactor;

a draft tube substantially concentrically positioned within the reactor and being positioned such that the liquids may flow inwardly and outwardly of the draft tube from opposed end portions of the draft tube, wherein space inwardly of the draft tube forms a primary mixing zone and space in the reactor, but outwardly of the draft tube, forms a secondary mixing zone;

an agitator positioned within the draft tube;

an inlet positioned approximate one end portion of the draft tube which introduces liquid and coagulant into the primary mixing zone;

an inlet connected to the draft tube and positioned between the agitator and the end portion of the draft tube through which flocculant is introduced into the primary mixing zone;

an encapsulating agent inlet positioned in the secondary reaction zone between the opposed end portions of the draft tube; and an outlet downstream of the encapsulating agent inlet.

7. The apparatus of claim 6, further comprising a sludge recycling inlet positioned upstream of the coagulant and liquid inlet.

8. The apparatus of claim 6, wherein the encapsulating agent inlet is positioned approximately halfway between the opposed ends of the draft tube.

9. The apparatus of claim 6, wherein the reactor and the draft tube are substantially cylindrical.

10. A method of treating liquid containing solid components comprising:

causing coagulation of the solid components by mixing coagulant with the liquid;

introducing coagulated solid components and the liquid into a primary reaction zone, containing an agitator, of a reactor which is substantially concentrically positioned with respect to a secondary reaction zone of the reactor;

forming flocs within the liquid around the coagulated solid components by introducing flocculant into the primary reaction zone at a location between the agitator and where the coagulated solid components and liquid are introduced into the primary reaction zone;

mixing the mixed coagulant and liquid with the flocculant and causing the resulting mixture to flow into the secondary reaction zone;

encapsulating the flocs within a shell by introducing an encapsulating agent into the secondary reaction zone;

recirculating the liquid and encapsulated flocs through the primary and secondary reaction zone; and passing the liquid and encapsulated flocs outwardly of the reactor.

11. The method of claim 10, further comprising introducing sludge into the liquid prior to introduction of the coagulant and liquid into the primary reaction zone.

12. The method according to claim 10, wherein the encapsulating agent is introduced into the secondary reaction zone at approximately a midpoint of the length of the secondary reaction zone.

13. The method according to claim 10, wherein flow of the liquid through the primary reaction zone is in an upward direction.

14. The method according to claim 10, wherein the flow of liquid in the secondary reaction zone is in the downward direction.

* * * * *